US006803962B1

(12) United States Patent
Elberbaum et al.

(10) Patent No.: US 6,803,962 B1
(45) Date of Patent: Oct. 12, 2004

(54) ADJUSTABLE VANDAL-PROOF HOUSING FOR TELEVISION CAMERA

(75) Inventors: David Elberbaum, Tokyo (JP); Seiji Tajima, Edogawa-ku (JP)

(73) Assignee: Elbex Video Ltd., Tokyo (JP)

( * ) Notice: Subject to any disclaimer, the term of this patent is extended or adjusted under 35 U.S.C. 154(b) by 0 days.

(21) Appl. No.: 09/440,342

(22) Filed: Nov. 15, 1999

(51) Int. Cl.[7] .............................................. H04N 5/225
(52) U.S. Cl. ...................................... 348/373; 348/143
(58) Field of Search ............................... 348/373, 375, 348/143, 151; 248/207

(56) References Cited

U.S. PATENT DOCUMENTS 4,160,999 A * 7/1979 Claggett ..................... 348/151
4,414,576 A * 11/1983 Randmae .................... 348/373
4,972,633 A * 11/1990 Wright .......................... 52/27
4,977,456 A * 12/1990 Furuya .................. 348/333.01
5,121,215 A * 6/1992 Boers et al. ................ 348/373
5,400,073 A * 3/1995 Morioka et al. ............ 348/335
D381,997 S * 8/1997 Morooka ................... D16/202
5,864,365 A * 1/1999 Sramek et al. .............. 348/373
5,966,176 A * 10/1999 Chow et al. ................ 348/373
6,392,704 B1 * 5/2002 Garcia-Ortiz ............... 348/373
6,678,001 B1 * 1/2004 Elberbaum .................. 348/373

* cited by examiner

*Primary Examiner*—Wendy R. Garber
*Assistant Examiner*—Jacqueline Wilson
(74) *Attorney, Agent, or Firm*—Katten Muchin Zavis Rosenman

(57) ABSTRACT

An adjustable housing for a surveillance TV camera which can be mounted by a mount to a wall, a pole or a ceiling inside or outside the building includes a front panel, an adjustable camera support for adjustably mounting the TV camera inside the housing, an adjustable pane assembly with front and rear holders and a transparent window having a transparent pane enclosed between the two holders and a rear support for supporting and locking the pane assembly to the front panel. The front holder has a front window frame which is smaller than the opening in the front panel through which the TV camera is aimed at different zones.

6 Claims, 5 Drawing Sheets

ADJUSTABLE VANDAL-PROOF HOUSING FOR TELEVISION CAMERA

BACKGROUND OF THE INVENTION

1. Field of the Invention

This invention relates to a housing for a television camera apparatus used for surveillance applications.

DESCRIPTION OF THE PRIOR ART

Surveillance television cameras are commonly mounted onto a wall, pole, ceiling or any other fixed bases by using an extended arm, known as a camera mount. The extended arm or camera mount includes a swivel joint, which permits the positioning of the horizontal and vertical axes of the camera in order to direct the camera lens toward its intended observation end. In many cases television cameras are covered by a housing and as a result, the entire camera assembly becomes large and heavy, which requires very heavy mounting accessories for vandal proof environment. Furthermore, it is not possible to employ television cameras that are mounted on a mount and a swivel joint because common mounts with swivel joints can be easily tampered with and/or break and/or can be used for self hanging inside jails, particularly for detention cells that are violent in nature. Therefore, cameras used for observation of detention cells are commonly mounted inside vandal proof camera housings which are made of a thick steel. Such camera housings are fixedly bolted to walls or ceilings, which limits the positioning of the horizontal and vertical axes of the cameras to within the housing interiors, with the camera positioning particularly restricted by the size of the visible area of the front pane.

Observing the interiors of small cells from within the cell interior require the use of very wide angle lenses, known as fisheye lenses. Cameras employing very wide angle lens require very wide front panes in order not to obstruct the vision to the lens. However, a wider pane can be easier tampered with and break and therefore, for a vandal proof housing it is necessary to minimize the size of the front pane. This in turn further restricts the adjustment of camera positioning within the housing, particularly when the camera is fitted with very wide angle lens.

SUMMARY OF THE INVENTION

It is an object of the present invention to provide a housing for a television camera that is vandal proof and which permits a wider repositioning of its horizontal and vertical axes for observing different scenes. This and other objects of the present invention are attained by a camera housing with an adjustable front pane comprising: a mount for attaching said housing to a structure selected from the group consisting of a wall, a pole and a ceiling; a front panel; an adjustable camera support for mounting a TV camera inside said housing and adjusting said camera within an interior of said housing by aiming said camera at different zones through an opening in said front panel; an adjustable pane assembly including a front holder, a rear holder and a transparent window having a transparent pane enclosed between said rear holder and said front holder which are attached together, wherein said rear holder includes a rear window frame and said front holder includes a front window frame which is smaller than said opening and wherein said transparent pane along with said rear window frame and said front window frame form said transparent window; a rear for supporting and locking said pane assembly to said front panel wherein said front panel includes fastening means for tightening said pane assembly between said rear support and said front panel and wherein said pane assembly further includes one of passages or cutouts for said fastening means such that said transparent window can be positioned at different zones of said opening commensurating with said aiming of said camera.

BRIEF DESCRIPTION OF THE DRAWINGS

The foregoing and other objects and features of the present invention will become apparent from the following description of preferred embodiments of the invention with reference to the accompanying drawings, in which.

DETAILED DESCRIPTION OF PREFERRED EMBODIMENTS

Figures 1A, 1B, 1C:
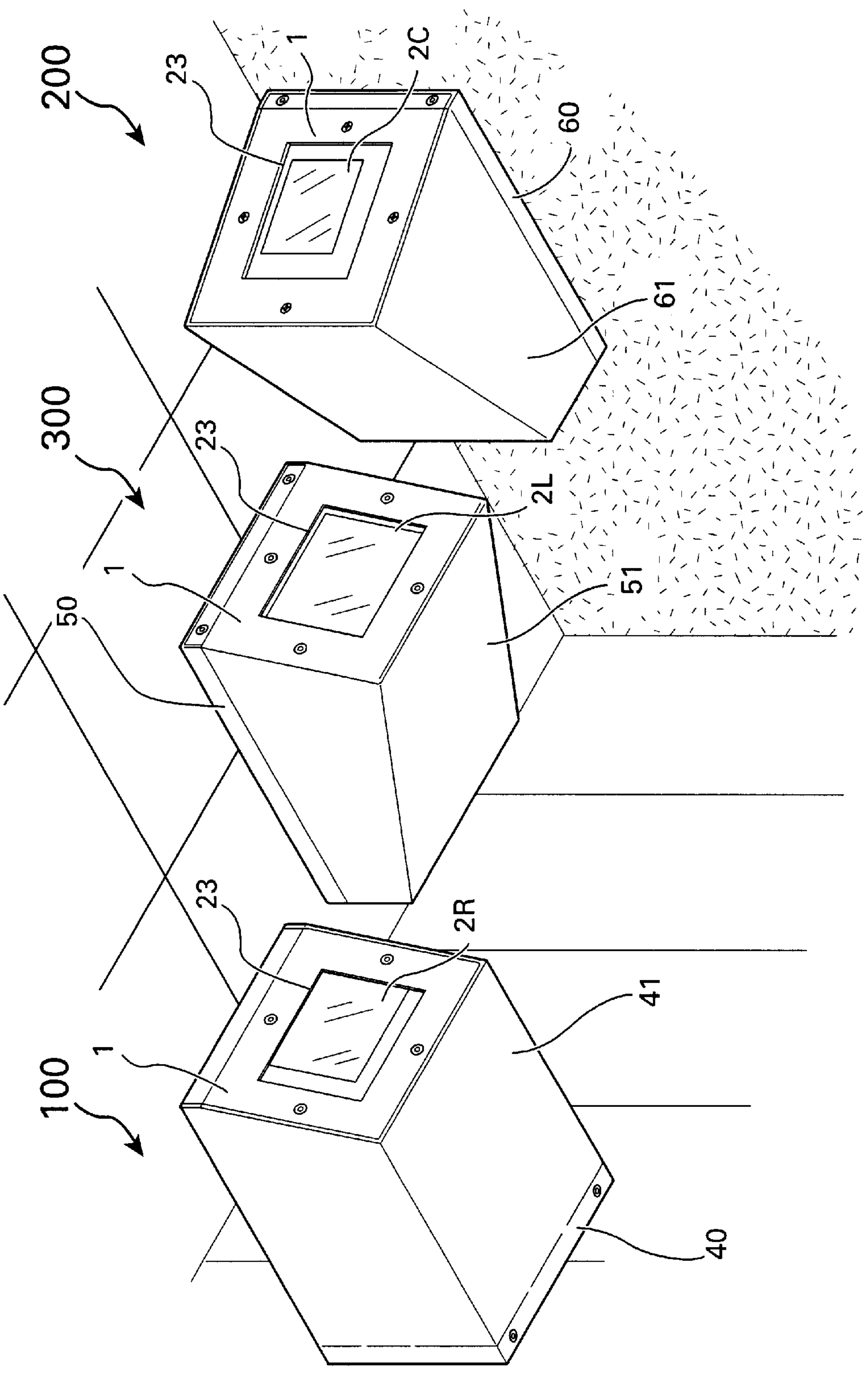
FIGS. 1A, 1B and 1C are perspective views of television camera housing systems of the invention, mounted to a wall and a ceiling.
Figures 3A, 3B:
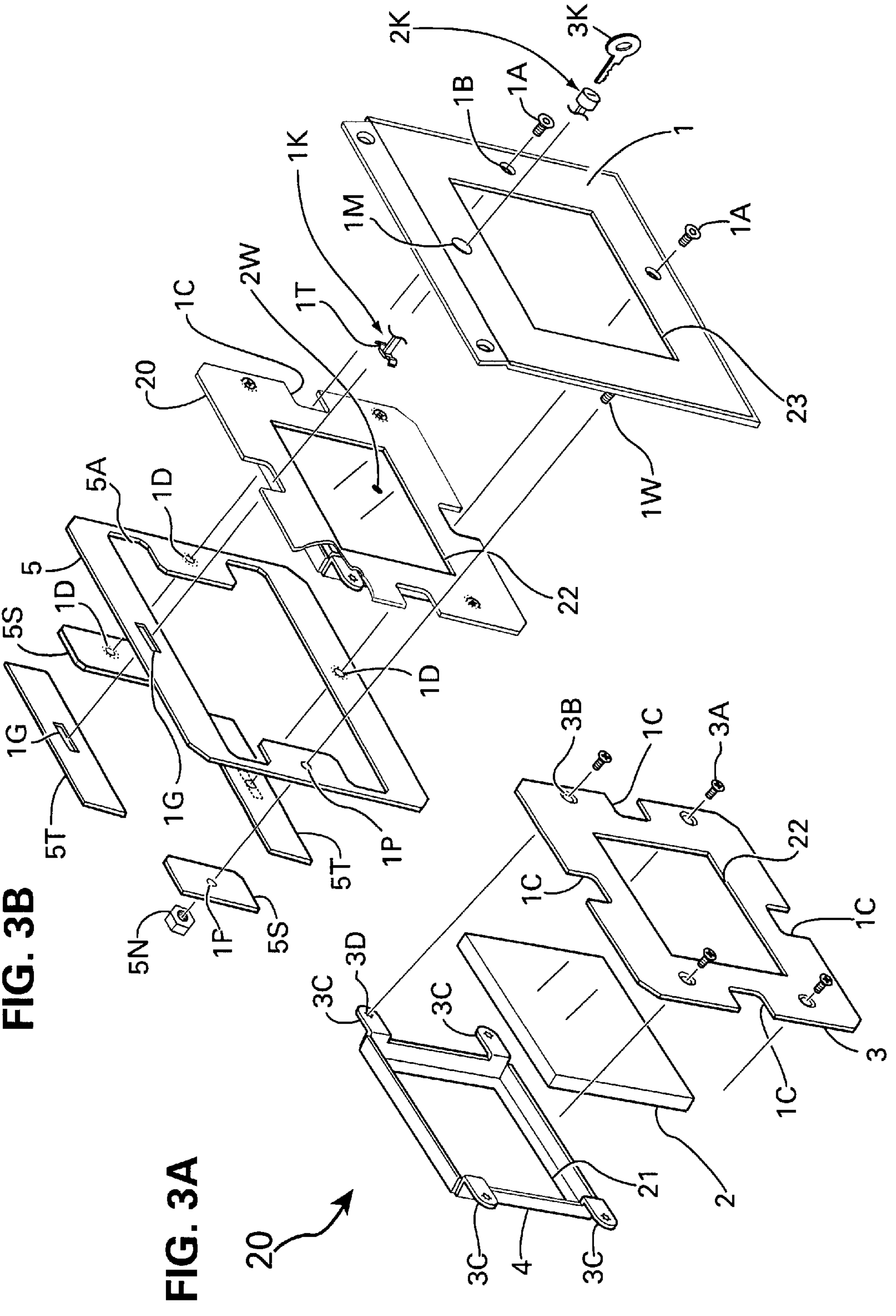
FIGS. 3A and 3B are exploded perspective views of the front pane and the front pane attachment, respectively of the camera case of the present invention.

Shown in FIGS. 1A and 1C are two vandal-proof TV camera housings or cases that are bolted to a wall. FIG. 1A shows a housing system 100 that is mounted perpendicularly to the wall and FIG. 1C shows a housing system 200 that is bolted in parallel to the wall. FIG. 1B shows a vandal-proof housing system 300 that is bolted to a ceiling. A front pane 2R is adjusted to an upper-right corner of an opening 23 in a front panel 1 of the housing system 100. The smaller pane 2C is adjusted to a center portion of the opening 23 of the front panel 1 of the housing system 200 and the largest pane 2L is adjusted to a lower-left corner of the opening 23 of the front panel 1 of the housing system 300. The size of the front window 22 of a front pane assembly 20 shown in FIGS. 3A and 3B is commensurate with the angle of view $\alpha$ of a lens 6 and the distance x between a lens focal point 7 and the windows 21 and 22 of the pane assembly 20 shown in FIG. 4A.

Figure 4A:
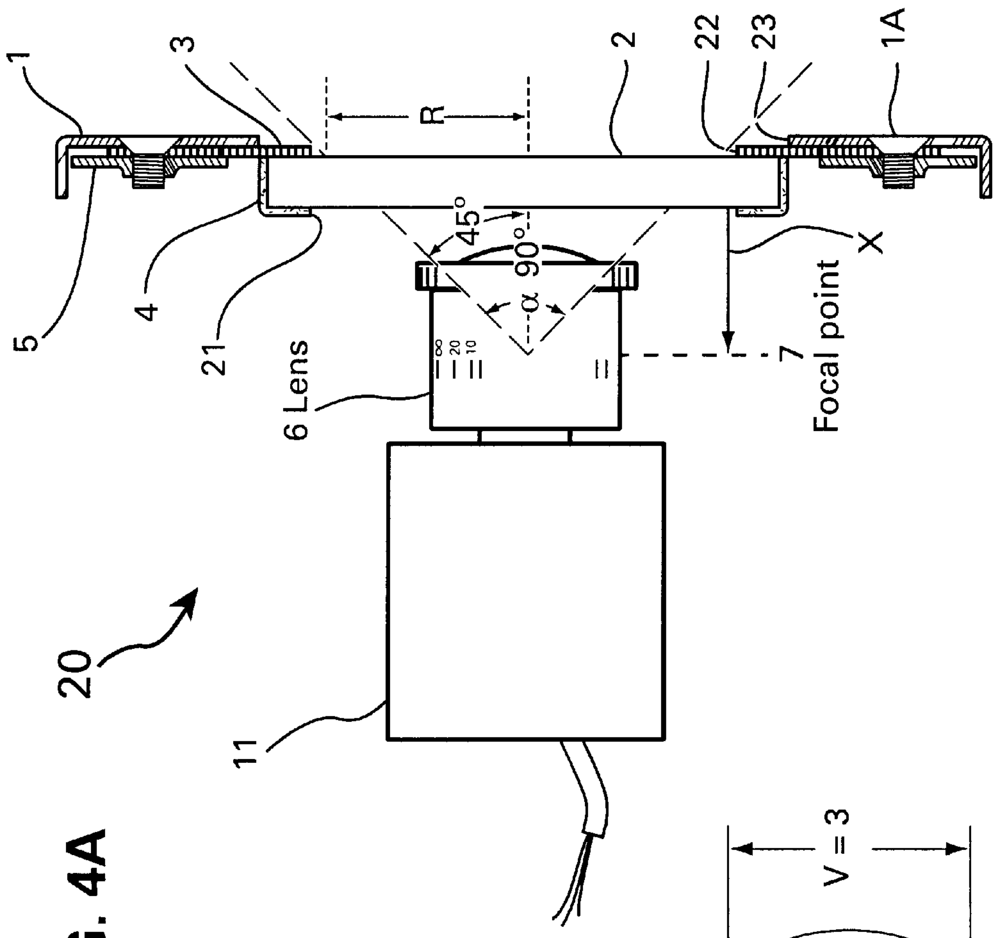
FIG. 4A is partial sectional view of the camera and the pane window for the housing of the preferred embodiment of the present invention.
Figure 4B:
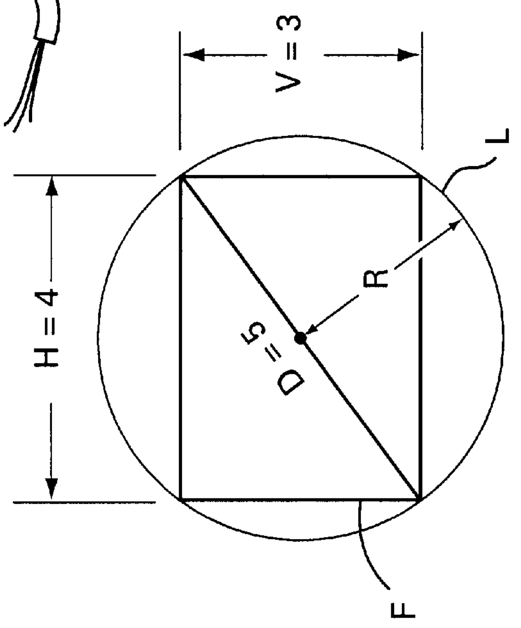
FIG. 4B is a diagram of the aspect ratio of a television system and the lens circular field of view.

All television systems such as NTSC standard of the European PAL standard employ a frame size having the aspect ratio 4:3 wherein the horizontal length H is 4 and the vertical height V is 3 as shown in FIG. 4B. Since the lenses provide a circular field of view L, having a radius R, the size of the circular field of view of the lens must be measured by the diagonal value D of the frame F which is equal to the diameter of circular field of view L. The diagonal value is calculated by the well known formula $D=\sqrt{H_2+V^2}$ or $D=\sqrt{4^2+3^2}=5$. Accordingly, the size ratios for the horizontal length H of 4, the vertical height V of 3 and the diagonal length D of 5 are the well known values of the standard television aspect ratio, and these values are used for calculating the size of the rear and front windows 21 and 22 of the pane assembly 20 and the opening 23 of the front panels 1 of the housing systems 100, 200 or 300.

Therefore, depending on the lens angle of view a and the distance X between the lens focal point 7 and the front window 22 it will be simple to calculate the size of the windows 21 and 22. For example, the lens shown in FIG. 4A has an angle of view α of 90° and it is mounted with its focal point 7 at a distance X of 50 mm. Accordingly, the length of the radius R of the lens circular field of view is 50 mm(tan45°=1, or R/X=1), the diagonal value D is therefore 100 mm, the horizontal length H is 80 mm (⅘×100) and the vertical height is 60 mm (⅗×100). If a difference aspect ratio is used, such as 16:9 aspect ratio of the high definition television, the window size will have to be calculated in accordance with the aspect ratio of the television system employed for television camera 11.

Figures 2A, 2B, 2C:
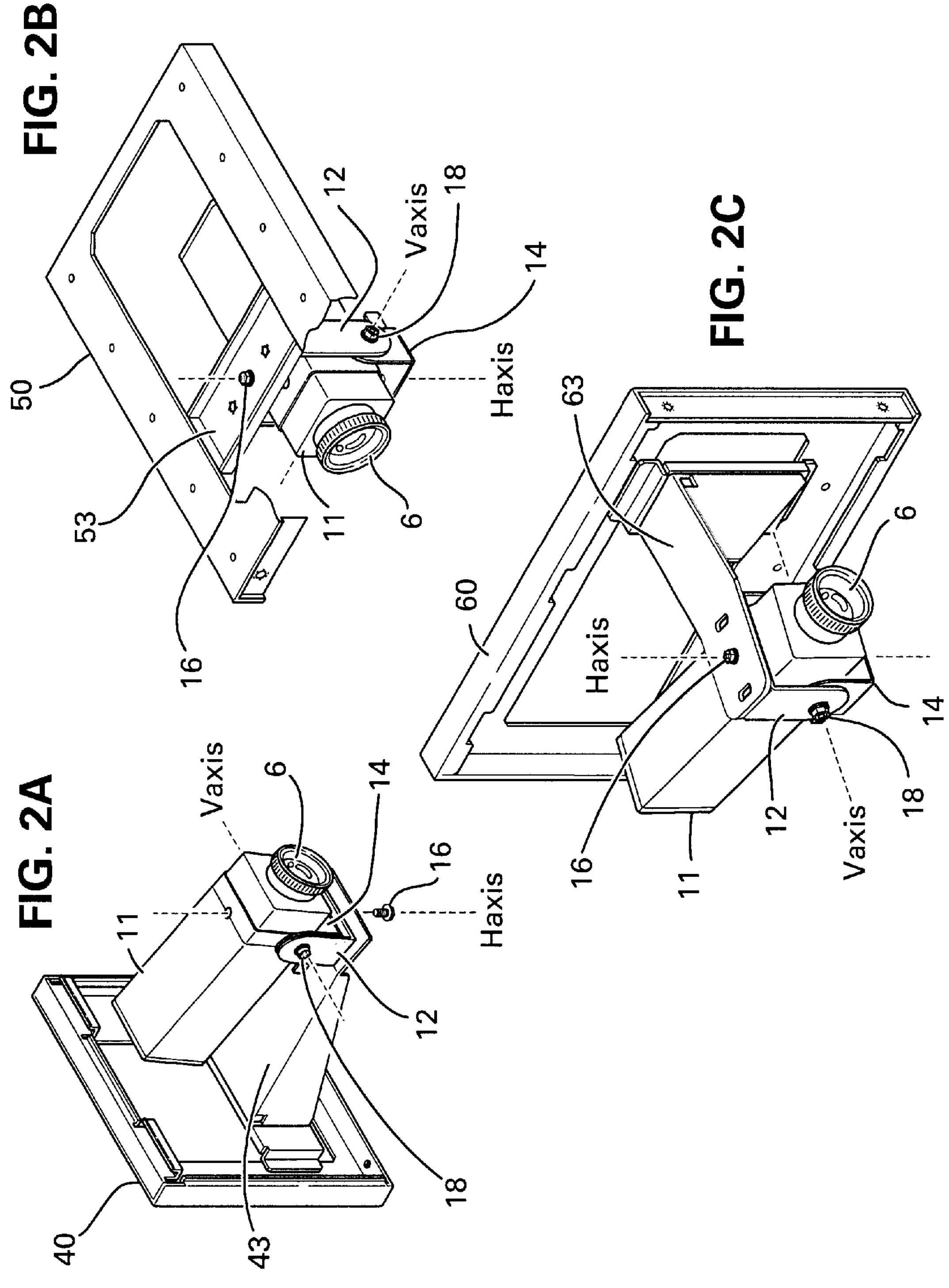
FIGS. 2A, 2B, and 2C, are perspective views of the camera mounting inside the housings shown in FIGS. 1A, 1B and 1C, respectively.

A parallel wall mount 60 of the camera housing system 200 of FIG. 1C is shown in detail in FIG. 2C without a housing cover 61 and the front panel 1. The camera 11 with the lens 6 are mounted on a vertical camera support 14 that provides vertical positioning for camera 11 around the V axis of the two vertical locking screws 18 (only one is shown), the vertical locking screws 18 also attach the vertical camera support 14 to a horizontal camera support 12. The horizontal camera support 12 is mounted onto a camera holder 63 using a horizontal locking screw 16 which provides for adjusting and locking the camera 11 with its supports 12 and 14 around its H axis; thereby, the camera can be adjusted to independent horizontal and vertical positions within the camera housing system 200.

As shown in FIG. 2C the similar camera positioning setup is provided in the camera housing system 300 of FIG. 1B, with the exception of a camera holder 53 which is attached in parallel to a ceiling mount 50, instead of the camera holder 63 which perpendicularly attached to the parallel wall mount 60 of the camera housing system 200.

As shown in FIG. 2A, the camera positioning setup of camera housing system 100 of FIG. 1A is also fundamentally same, with the exception of the camera holder 43 which is attached perpendicular to the vertical wall mount 40 and which attaches the horizontal camera support 12 from its bottom side, instead of the horizontal camera support which is attached to camera holders 53 and 63 of the camera housing systems 200 and 300 from their top side.

It is obvious from the explanation above that the camera 11 along with its lens 6 can be positioned around the H axis and V axis within the camera housing interiors and within the clearance of opening 23 of the front panel 1 for observing different scenes.

Instead of using the vertical and horizontal camera supports and/or the camera holders, camera 11 can be mounted onto a well known swivel joint for positioning adjustment, or onto a well known tripod head, or onto any other well known camera positioning devices.

Vandal-proof housings employ a thick front transparent pane to ensure that the pane cannot be easily broken. The thickness of the front pane depends on the size of the front pane window; for a larger front pane window a thicker pane is needed. On the other hand, a thicker pane reduces the optical transparency and clarify of the pane and degrades the overall optical performance of the camera mounted inside such vandal-proof housing.

Shown in FIG. 3A is the pane assembly 20 including a front pane holder 3, a transparent pane 2 and a rear pane holder 4. The front pane holder 3 has a front window 22 and the rear pane holder 4 has a rear window 21, both windows having a size commensurating with the lens used and the distance between the focal point 7 and the front window 22 as shown in FIG. 4A, or is slightly larger, to allow for some tolerances during the positioning of the camera. However, minimizing the window sizes improve upon the strength of the pane and provides for the use of a thinner pane. The pane 2 is mounted between the front and the rear holders 3 and 4 and fastened by four screws 3A shown in FIG. 3A. The front pane holder 3 provides four tapered holes 3B for the flat head screws 3A and the rear holder comprises thread holes 3D, complementing the thread of screws 3A. Instead of using the screws 3A it is possible to attach the front and rear pane holders by welding or by riveting or by other fastening means, so long as the rear and front holders are fixedly attached together and enclose the transparent pane 2.

Shown in FIG. 3B is the pane assembly 20 supported between the front panel 1 and a rear support plate 5. Four locking screws 1A tighten the rear support plate 5 and lock the pane assembly into position.

The locking screws 1A may be special flat head screws or that type head screws requiring a special non-standard screw driver shape, thereby preventing the use of knifes and other available means to tamper with the locking screws. The front panel 1 is provided with tapered holes 1B or other shaped holes to accommodate the screw head shapes and the rear support plate 5 is provided with threaded holes 1D, complimentary to the locking screws 1A thread.

A key lock with 1K a key 3K can be used instead of the screws 1A and the panel 1 can be provided with a matching hole 1M to accommodate the lock, while the rear support plate 5 can be provided with a groove 1G complementary to a tongue 1T of the key lock 1K; reference numeral 2K denotes a key lock assembly. Alternatively, the screws 1W can be fixedly attached or welded to the front panel and the holes 1P of the rear support plate can be non threaded holes and the rear support plate 5 can be tightened to the front panel by using complimentary nuts 5N to the welded screws 1W.

The single support plate 5 shown in FIG. 3B can be constructed of several parts instead of the single plate such as the rear support 5S and 5T shown in FIG. 3B; similarly, the locking screw cutouts 1C or the movement cutouts 5A can be differently arranged as long as the visible pane 2W of the pane assembly 20 can be moved around within the opening 23 of the front panel 1 without being obstructed by the locking screws 1A or the locks 1K or the nuts 1N or the any other suitable fasteners used instead of the locking screws 1A and that the single support plate 5 or that the several supports 5S and 5T used to replace the single support plate are such that the rear support tightens and locks the pane assembly 20 to the front panel 1.

Figure 5:
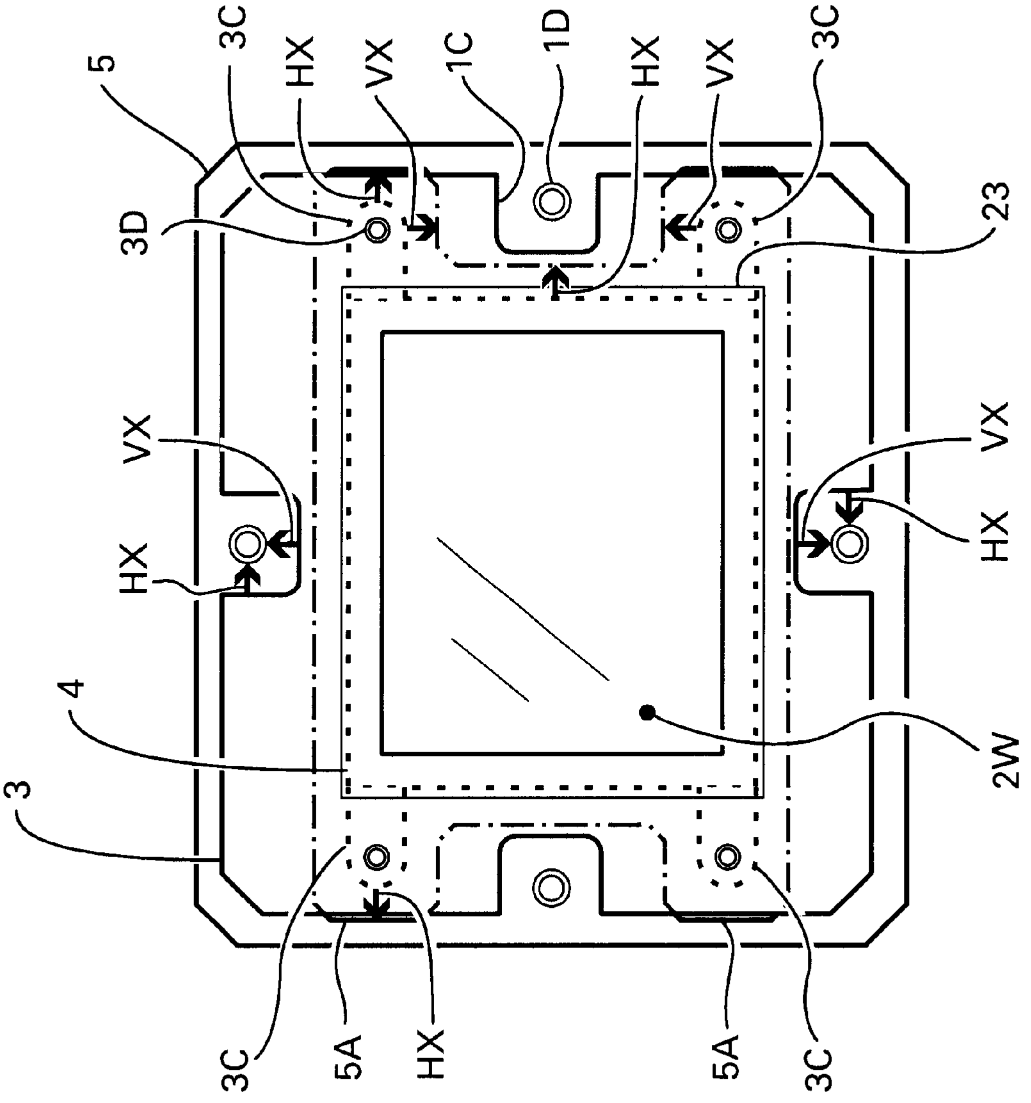
FIG. 5 is a front view of the front pane assembly showing the movements thereof.

The locking screw cutouts 1C provide a passage for the locking screws 1A and at the same time the cutouts size is such that the pane assembly 20 can be repositioned and locked with its visible pane 2W into different zones within the front panel opening 23. Similarly, the four tongues 3C of the rear panel holder 4 having the threaded hole 3D and the movement cutouts 5A of the rear support plate 5 are sized to enable the tongues 3C to move freely inside the cutouts 5A so that the visible pane 2W is freely shifted and locked into different zones within the front panel opening 23 as shown in FIG. 5. The vertical shifting VX and the horizontal shifting HX are sized so as not to reveal the screw 3A of the pane assembly 20. The visible pane 2W shown in FIG. 5 is a pane calculated for a wide angle lens, but the sizes of the visible pane 2W can be modified into any sizes, so is the opening in the front panel, similarly the size of the tongues 3C, the cutouts 1C and 5A can be differently sized or shaped to allow for different movements, and tolerances.

The pane 2 is constructed of hardened glass or plastic material and the holders 3, the support 5, the front panel 1, the housings 41, 51, and 61 and the mounts 40, 50 and 60 are made of steel, but can be made of any other metals or plastic materials.

The housing systems 100, 200 and 300 shown in FIGS. 1A, 1B and 1C, respectively can be modified by changing their basic orientation downward, sideways or upwards, as well as their width, length or height. In fact, it becomes obvious that unlimited shapes and sized can be designed for camera housings that can incorporate the means to modify and adjust a front pane, so as to provide for accurate positioning of camera inside the housing, without obstructing the field of view of the lens as disclosed here. It will of course, be understood by those skilled in the art that the particular embodiment of the invention here presented is by way of illustration only, and is meant to be in no way restrictive, therefore, numerous changes and modifications may be made, and the full used of equivalents resorted to, without departing from the spirit of scope of the invention as outlined in the appended claims.

What is claims is:

1. A camera housing with an adjustable front pane comprising:

a mount for attaching said housing to a structure selected from the group consisting of a wall, a pole and a ceiling;

a front panel;

an adjustable camera support for mounting a TV camera inside said housing and adjusting said camera within an interior of said housing by aiming said camera at different zones through an opening in said front panel;

an adjustable pane assembly including a front holder, a rear holder and a transparent window having a transparent pane enclosed between said rear holder and said front holder which are attached together, wherein said rear holder includes a rear window frame and said front holder includes a front window frame which is smaller than said opening and wherein said transparent pane along with said rear window frame and said front window frame form said transparent window; and a rear support for supporting and locking said pane assembly to said front panel, wherein said front panel includes fastening means for tightening said pane assembly between said rear support and said front panel and wherein said pane assembly further includes one of passages or cutouts for said fastening means such that said transparent window can be positioned at different zones of said opening commensurating with said aiming of said camera.

2. The camera housing with an adjustable front pane in accordance to claim 1, wherein said rear window frame is smaller than said opening.

3. The camera housing with an adjustable front pane in accordance to claim 2, wherein said front window frame is larger than or equal to said opening.

4. The camera housing with an adjustable front pane in accordance to claim 1, wherein said fastening means are selected from the group consisting of screws, locks, nuts and a combination thereof.

5. The camera housing with an adjustable front pane in accordance to claim 1, wherein said rear support includes more than one part.

6. The camera housing with an adjustable front pane in accordance to claim 1, wherein said rear holder and said front holder are attached together by one of screws, welding, and riveting.

* * * * *